(12) United States Patent
Ogata

(10) Patent No.: US 9,027,720 B2
(45) Date of Patent: May 12, 2015

(54) VIBRATION DAMPING MECHANISM

(75) Inventor: Tatsuya Ogata, Ikoma (JP)

(73) Assignee: Daishowa Seiki Kabushiki Kaisha, Higashiosaka-shi, Osaka (JP)

(*) Notice: Subject to any disclaimer, the term of this patent is extended or adjusted under 35 U.S.C. 154(b) by 89 days.

(21) Appl. No.: 13/817,843

(22) PCT Filed: Jul. 14, 2011

(86) PCT No.: PCT/JP2011/066116
§ 371 (c)(1),
(2), (4) Date: May 1, 2013

(87) PCT Pub. No.: WO2012/032852
PCT Pub. Date: Mar. 15, 2012

(65) Prior Publication Data
US 2013/0206525 A1    Aug. 15, 2013

(30) Foreign Application Priority Data
Sep. 10, 2010 (JP) .................... 2010-202936

(51) Int. Cl.
*F16F 7/08* (2006.01)
*B23B 27/00* (2006.01)
(Continued)

(52) U.S. Cl.
CPC ................ *F16F 7/08* (2013.01); *B23B 27/002* (2013.01); *B23B 27/007* (2013.01); *F16F 15/1435* (2013.01); *F16F 15/322* (2013.01); *F16F 2222/04* (2013.01); *B23B 29/022* (2013.01)

(58) Field of Classification Search
CPC .. B23B 27/002; B23B 27/007; B23B 29/022; F16F 15/1435; F16F 7/08; F16F 15/322; F16F 2222/04

USPC ................. 188/378–381; 267/137, 125, 141; 408/143; 409/234, 141, 143, 232
See application file for complete search history.

(56) References Cited

U.S. PATENT DOCUMENTS 2,137,591 A * 11/1938 Sarazin ................... 188/378
3,447,402 A * 6/1969 Ray .......................... 408/143
(Continued)

FOREIGN PATENT DOCUMENTS

| CN | 1478182 A | 2/2004 |
| JP | 06-74205 U | 10/1994 |

(Continued)

OTHER PUBLICATIONS

International Search Report of the International Searching Authority mailed Sep. 20, 2011 for the corresponding international application No. PCT/JP2011/066116 (with English translation).
(Continued)

*Primary Examiner* — Thomas J Williams
*Assistant Examiner* — Mariano Sy
(74) *Attorney, Agent, or Firm* — Muncy, Geissler, Olds & Lowe, P.C.

(57) ABSTRACT

A vibration damping mechanism allows increase of an absorption amount of vibration energy, with less possibilities of increase in the manufacture cost of a vibration damping weight and of reduction in the strength of a shaft section. Within a cylindrical hollow portion formed inside the shaft section, there are accommodated a plurality of weight members divided from each other along the circumferential direction about the axis of the hollow portion. An urging member is provided for urging the weight members toward the axis such that dividing faces of adjacent weight members are brought into surface contact with each other.

13 Claims, 3 Drawing Sheets

(51) Int. Cl.

*F16F 15/14* (2006.01)

*F16F 15/32* (2006.01)

*B23B 29/02* (2006.01)

(56) References Cited

U.S. PATENT DOCUMENTS

| | | | | |
|---|---|---|---|---|
| 3,559,512 | A * | 2/1971 | Aggarwal | 408/143 |
| 3,774,730 | A * | 11/1973 | Maddux | 188/379 |
| 3,838,936 | A * | 10/1974 | Andreassen et al. | 408/143 |
| 3,856,107 | A * | 12/1974 | Rabett | 181/207 |
| 4,385,665 | A * | 5/1983 | Knoll | 173/162.1 |
| 4,553,884 | A * | 11/1985 | Fitzgerald et al. | 408/143 |
| 4,616,738 | A * | 10/1986 | Shurtliff | 188/380 |
| 5,743,326 | A | 4/1998 | Slocum | |
| 6,095,922 | A * | 8/2000 | Friedrichsen et al. | 464/24 |
| 6,443,673 | B1 | 9/2002 | Etling et al. | |
| 8,308,404 | B2 * | 11/2012 | Ostermann et al. | 409/141 |
| 8,337,125 | B2 * | 12/2012 | Digernes et al. | 408/143 |
| 2003/0147707 | A1 | 8/2003 | Perkowski | |
| 2004/0003677 | A1 | 1/2004 | Yamamoto | |
| 2008/0060472 | A1 | 3/2008 | Yamamoto | |

FOREIGN PATENT DOCUMENTS

| | | | |
|---|---|---|---|
| JP | 2002-174290 A | | 6/2002 |
| JP | 2002-174290 A | * | 6/2002 |
| JP | 2003-521381 A | | 7/2003 |
| JP | 2005-516780 A | | 6/2005 |

OTHER PUBLICATIONS

International Preliminary Report on Patentability mailed Apr. 18, 2013 in the corresponding international application No. PCT/JP2011/066116 (English translation only).

Office Action for Chinese corresponding Patent Application No. 201180043560.X mailed on Jul. 30, 2014.

\* cited by examiner

VIBRATION DAMPING MECHANISM

CROSS REFERENCE TO RELATED APPLICATIONS

This application is a U.S. national stage application of PCT/JP2011/066116 filed on Jul. 14, 2011, and claims priority to, and incorporates by reference, Japanese Patent Application No. 2010-202936 filed on Sep. 10, 2010.

TECHNICAL FIELD

The present invention relates to a vibration damping mechanism wherein a vibration damping weight is accommodated within a cylindrical hollow portion formed inside a shaft section of a tool holder or the like coaxially with the axis of the hollow portion.

BACKGROUND ART

For a cutting work of metal, a tool holder having a cutter blade affixed to its leading end is attached to a machine tool in a cantilevered manner. Hence, the problem of deterioration in the working accuracy may occur if there occurs a so-called "chattering vibration" in the tool holder in the course of a cutting work for cutting metal which is effected by driven revolution of the tool holder.

The above-described vibration damping mechanism is configured to cause the vibration damping weight accommodated in the hollow portion to be vibrated in such a manner to offset chattering vibration and also to absorb the energy of the chattering vibration if or when such chattering vibration occurs in the course of a cutting work, thereby to restrict this chattering vibration for achieving improvement in the working accuracy.

The conventional vibration damping mechanism is configured to be capable of absorbing chattering vibration energy through friction or impact between a single vibration damping weight accommodated within the hollow portion and the inner face of this hollow portion (see e.g. PTL 1).

CITATION LIST

Patent Literature

PTL 1: Japanese Patent Application National Transfer Publication No. 2003-521381

SUMMARY OF INVENTION

For the reason set forth above, the absorption amount of the vibration energy corresponds to the weight of the vibration damping weight. Hence, for increase of the absorption amount of the vibration energy, a heavier weight needs to be accommodated within the hollow portion.

In accommodating a heavier weight within the hollow portion, if a weight having a large specific weight, but made of an expensive super-hard alloy or heavy metal is accommodated, this may invite increase in the manufacture cost of the vibration damping weight. Also, if a weight having a small specific weight, but made of an inexpensive metal is accommodated, this may invite enlargement of the hollow portion, which leads in turn to reduction in the strength of the tool holder.

The present invention has been made in view of the above-described state of the art. The object of the present invention is to provide a vibration damping mechanism that allows increase of an absorption amount of vibration energy with less possibilities of increase in the manufacture cost of vibration damping weight and of reduction in the strength of the shaft section.

According to a first characterizing feature of a vibration damping mechanism relating to the present invention, the mechanism comprises a plurality of weight members accommodated within a cylindrical hollow portion formed inside a shaft section, the weight members being divided radially from each other along the circumferential direction about the axis of the hollow portion; and an urging member for urging the weight members toward the axis such that dividing faces of adjacent weight members are brought into surface contact with each other.

With the vibration damping mechanism having the above-described arrangement, within a cylindrical hollow portion formed inside the shaft section, there are accommodated a plurality of weight members divided from each other.

Therefore, in association with chattering vibration in the shaft section, the dividing faces of the adjacent weight members can be caused to slide against each other, so that the vibration energy can be absorbed as friction energy or impact energy generated between the dividing faces.

Further, since the plurality of weight members divided from each other along the circumferential direction about the axis of the hollow portion are accommodated within the hollow portion, it is possible to cause the dividing faces of the weight members to slide against each other along the radial direction of the shaft section, so that chattering vibration occurring in the radial direction of the shaft section can be alleviated effectively.

Moreover, since an urging member is provided for urging the weight members toward the axis of the hollow portion such that dividing faces of adjacent weight members are brought into surface contact with each other, a resistance can be positively applied to the sliding between the dividing faces, thus increasing the friction energy between the dividing faces. As a result, the absorption amount of the vibration energy can be further increased.

Therefore, with the vibration damping mechanism having the above-described arrangement, it is possible to increase an absorption amount of vibration energy with less possibilities of increase in the manufacture cost of vibration damping weight and of reduction in the strength of the shaft section.

According to a second characterizing feature of the present invention, the urging member comprises an annular elastic member disposed between the outer circumferential faces of the plurality of weight members and the inner circumferential face of the hollow portion.

With the above-described arrangement, it is possible to urge the plurality of weight members for moving these altogether and easily toward the axis According to a third characterizing feature of the present invention, the mechanism further comprises a restricting member for restricting a displacement amount of the plurality of weight members away from the axis.

With the above-described arrangement, since the displacement amount of the plurality of weight members away from the axis is restricted, returning displacement of the weight members toward the axis after their displacement away from the axis in association with vibration in the shaft section can be facilitated. So that, it becomes possible to stabilize the revolution of the shaft section and also to enhance the vibration energy absorption effect by the mutual sliding between the dividing faces.

Next, embodiments of the present invention will be described with reference to the accompanying drawings.

[First Embodiment]

Figure 1:
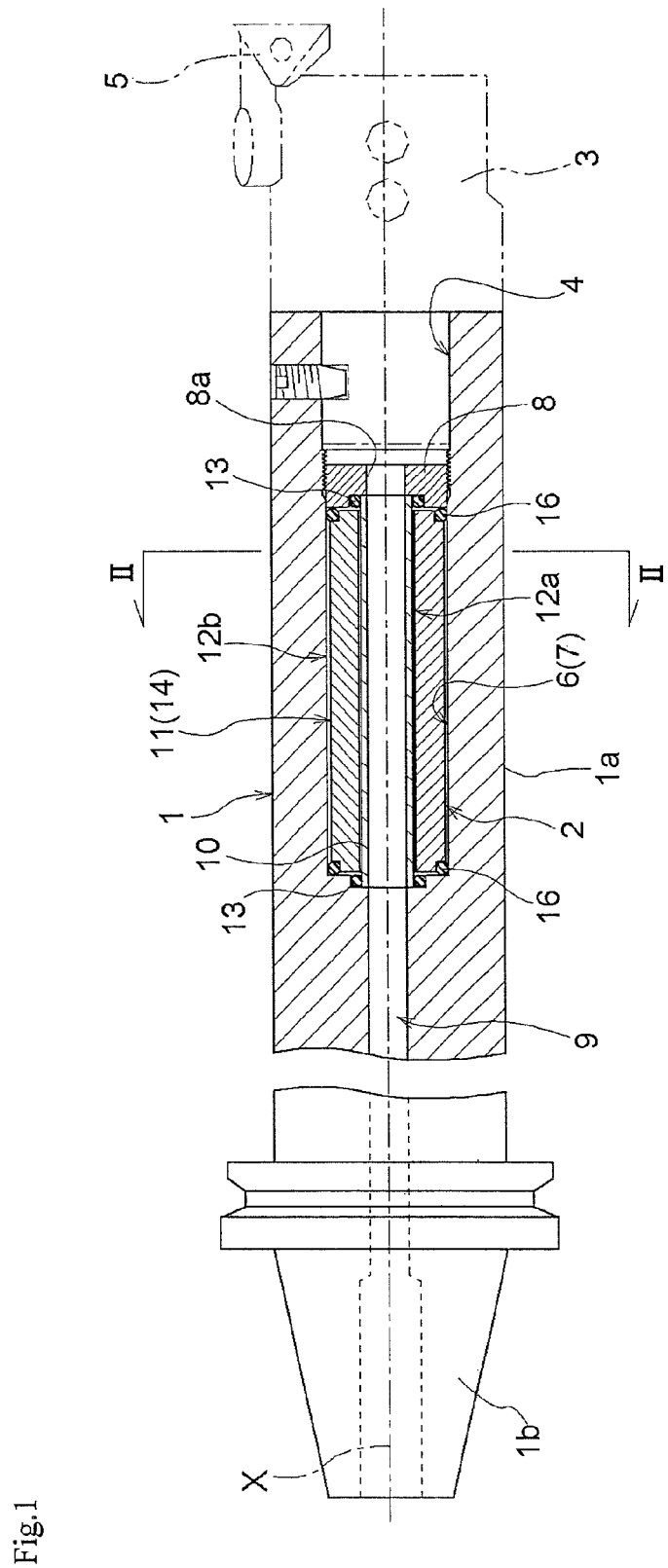
[FIG. 1] is a vertical section of a tool holder provided with a vibration damping mechanism.
Figure 2:
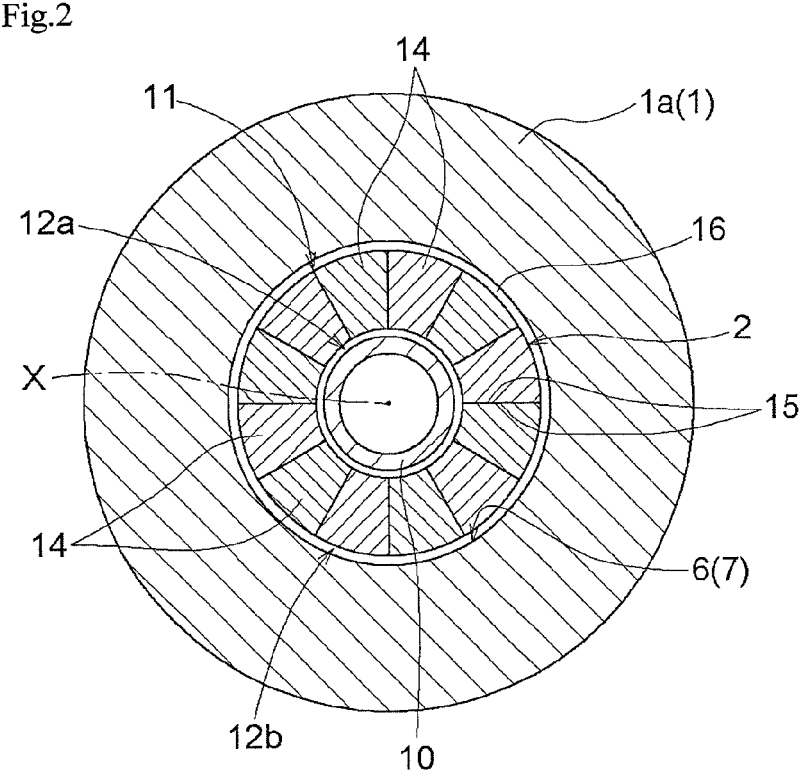
[FIG. 2] is a section taken along a line II-II in FIG. 1.

FIG. 1 and FIG. 2 show a tool holder (an example of a "shaft section") 1 provided with a vibration damping mechanism 2 according to the present invention.

The vibration damping mechanism 2 is mounted inside the tool holder 1 made of steel and having a circular horizontal cross section and an outer circumferential portion coaxial with the rotational axis X.

The tool holder 1 includes a shaft section body 1a for tool mounting and a tapered portion 1b for connection to a rotational shaft of a work machine, the tapered portion 1b being coaxially integrated with the shaft section body 1a. The tool holder 1 is driven to rotate by a rotational shaft connected to the tapered portion 1b.

At the leading end of the shaft section body 1a, there is formed a mounting hole 4 for a tool head 3. As indicated by a virtual line in FIG. 1, in the mounting hole 4, there is non-withdrawably fixed a tool head 3 to which a throw-away tip 5 having a cutting blade portion is secured.

Inside the shaft section body 1a, there is formed a hollow portion 6 having a circular cross section coaxial with the rotational axis X of the tool holder 1; and the vibration damping mechanism 2 is mounted within this hollow portion 6.

In the hollow portion 6, there is defined a shaft hole 7 opened to the leading end of the shaft section body 1a and having a circular cross section, with the shaft hole 7 being partitioned by a plug member 8 threaded to the inner circumferential face of the shaft hole 7, and the hollow portion 6 is formed on the side closer to the tapered portion 1b than the plug member 8.

The mounting hole 4 is formed on more leading end side of the shaft hole 7 than the plug member 8.

The tool holder 1 defines a coolant feeding passage 9 for feeding a coolant such as cutting oil to the tool head 3 via the mounting hole 4, the coolant feeding passage 9 extending through the shaft section body 1a and the tapered portion 1b coaxially with the rotational axis X.

To the coolant feeding passage 9, there is connected a coolant pipe 10 which is coaxial with the rotational axis X and extends through the hollow portion 6. The coolant pipe 10 is connected to a through hole 8a defined in the plug member 8 to be communicated to the mounting hole 4.

The vibration damping mechanism 2 includes a vibration damping weight 11 formed of super-hard alloy made by sintering of WC (tungsten carbide) or the like, with the weight 11 being accommodated therein coaxially with the rotational axis X and with forming gaps 12a, 12b relative to the outer circumferential face of the coolant pipe 10 and the inner circumferential face of the hollow portion 6.

At the connecting portion of the coolant pipe 10 connected to the coolant feeding passage 9 and the connecting portion of the coolant pipe 10 connected to the through hole 8a of the plug member 8, respectively, there is mounted an elastic O-ring 13, thus eliminating the risk of inadvertent intrusion of liquid such as the coolant into the gaps 12a, 12b formed respectively between the vibration damping weights 11 and the outer circumferential face of the coolant pipe 10 and between the vibration damping weights 11 and the inner circumferential face of the hollow portion 6, so that deterioration in the vibration damping effect can be prevented.

Figure 3:
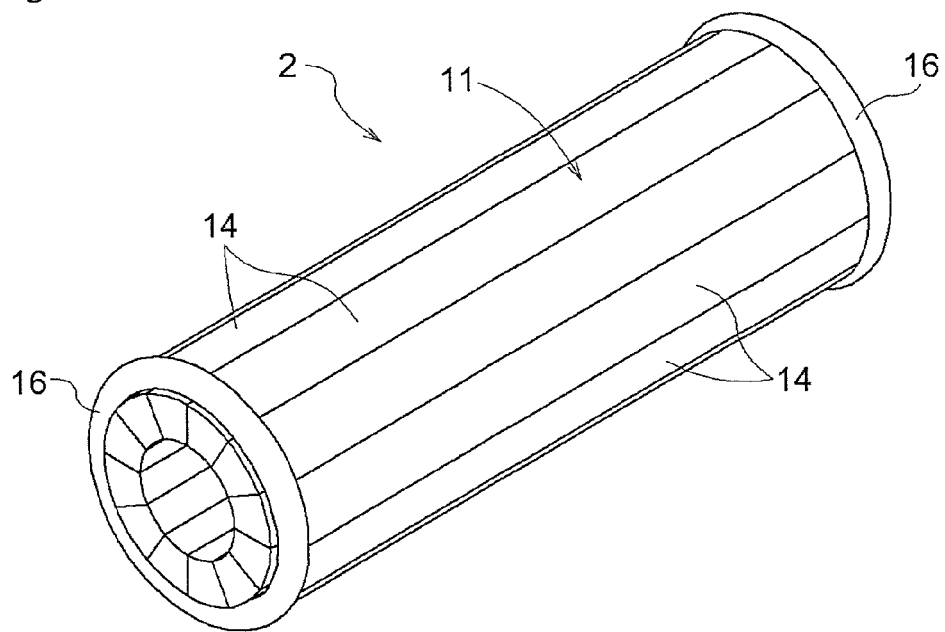
[FIG. 3] is a perspective view showing the vibration damping mechanism.

The vibration damping weight 11, as shown in FIG. 2 and FIG. 3, is divided into a plurality of weight members 14 having a fan-shaped cross section and equidistantly divided from each other, with these weight members 14 being arranged in a cylindrical layout around the coolant pipe 10 and accommodated as such within the hollow portion 6.

Incidentally, as the plug member 8 is strongly threaded toward the vibration damping weight 11, a compression force in the direction along the rotational axis X is applied to each weight member 14.

In order for causing dividing faces 15 of adjacent weight members 14 to strongly slide against each other in association with chattering vibration of the tool holder 1, with the plurality of weight members 14 being accommodated in the cylindrical layout within the hollow portion 6, urging members 16 are provided at the opposed ends in the direction of rotational axis X for urging these weight members 14 so that the dividing faces 15 of the adjacent weight members 14 may be brought into surface contact against each other.

The urging member 16 is formed of an elastic O-ring as an annular elastic member interposed between the outer circumferential faces of the plurality of weight members 14 and the inner circumferential face of the hollow portion 6.

[Second Embodiment]

Figure 4:
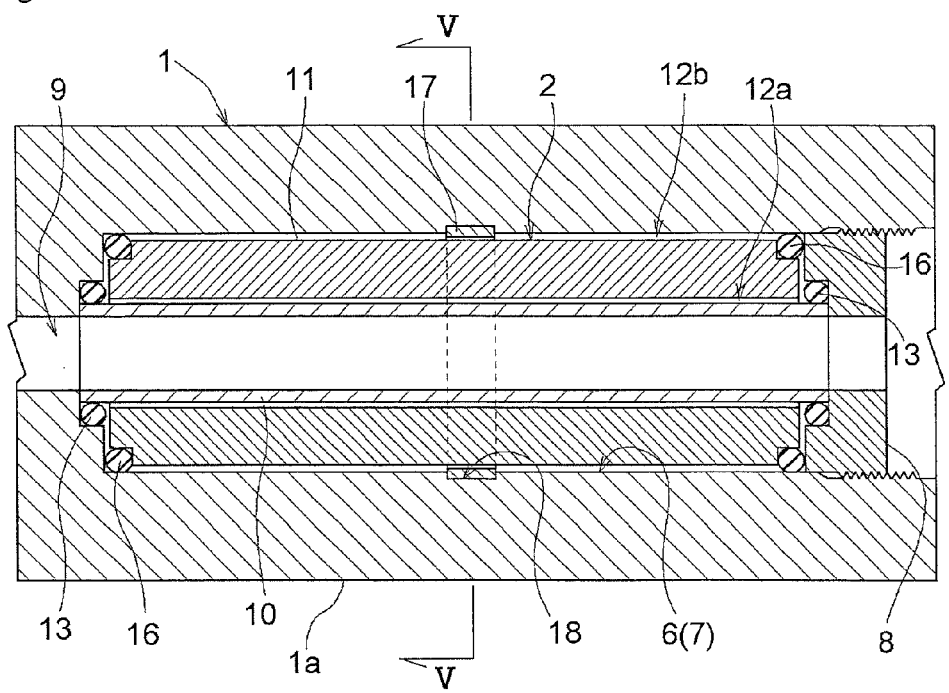
[FIG. 4] is a vertical section showing a vibration damping mechanism according to a second embodiment.
Figure 5:
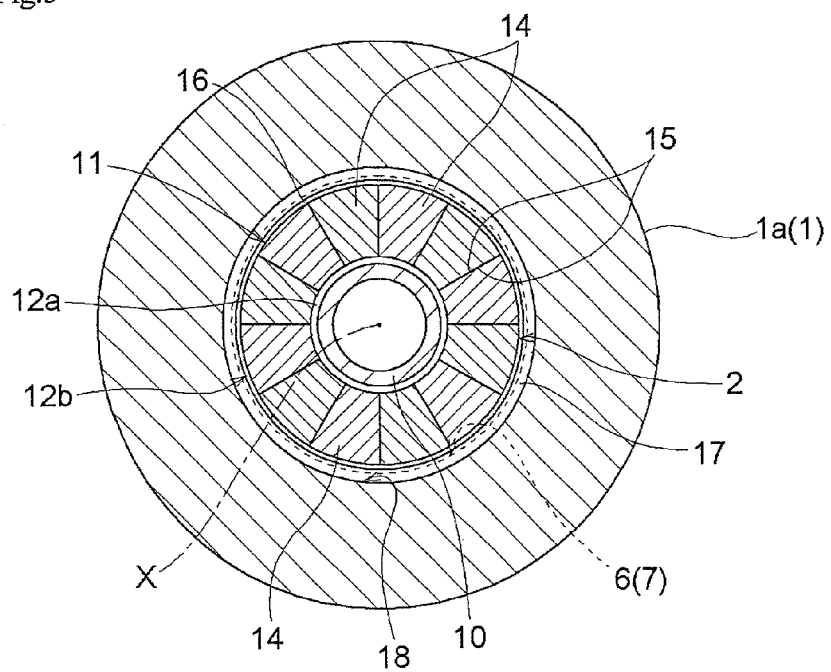
[FIG. 5] is a section taken along a line V-V in FIG. 4.

FIG. 4 and FIG. 5 show a further embodiment of the vibration damping mechanism according to the present invention.

In the vibration damping mechanism according to this embodiment, at the center position in the direction of the rotational axis X of the vibration damping weight 11 divided into the plurality of weight members 14, there is mounted a restricting member 17 for restricting an amount of displacement of the plurality of weight members 14 away from the rotational axis X.

The restricting member 17 is comprised of a metal ring that has an inner diameter smaller than the inner diameter of the hollow portion 6 and an outer diameter larger than the inner diameter of the hollow portion 6; and as its outer circumferential side is fitted in a circumferential groove 18 defined in the inner circumferential face of the hollow portion 6 against its inadvertent detachment toward the weight members 14.

The rest of the construction is identical to that of the first embodiment.

[Other Embodiments]

1. In the vibration damping mechanism according to the present invention, the weight members equidistantly divided from each other along the circumferential direction about the axis of the hollow portion may be further divided in the direction of the axis of the hollow portion also.

In this case, in association with chattering vibration of the shaft section, the dividing faces of the weight members adjacent each other in the direction along the axis of the hollow portion may be caused to slide against each other, so that the vibration energy can be absorbed as friction energy or impact energy between the dividing faces.

Further, if an annular elastic member is interposed between the outer circumferential face of each weight member and the inner circumferential face of the hollow portion, each weight member can be urged to move toward the axis of the hollow portion, whereby the inertial moment of the shaft section can be reduced, thus allowing smooth revolution of the shaft section. As a result, reduction in the vibration damping effect can be prevented.

2. The vibration damping mechanism according to the present invention is not limited to the one wherein a plurality of weight members equidistantly divided from each other along the circumferential direction around the axis of the hollow portion are accommodated within the hollow portion. Instead, the mechanism can be configured such that a plurality of weight members non-equidistantly divided from each other along the circumferential direction around the axis of the hollow portion are accommodated within the hollow portion.

3. The vibration damping mechanism of the present invention may be configured such that in addition to the plurality of weight members divided from each other along the circumferential direction around the axis of the hollow portion, a plurality of weight members divided along the direction of the axis of the hollow portion are accommodated e.g. at each or either one of the opposed ends along the axis direction of the hollow portion.

4. In the vibration damping mechanism of the present invention, a plurality of weight members divided from each other along the circumferential direction around the axis of the hollow portion can be accommodated in the hollow portion formed in a shaft section other than a tool holder.

5. In the vibration damping mechanism of the present invention, the shaft section need not be a rotary body and the axis of the hollow portion need not be in agreement with the axis of the shaft section.

INDUSTRIAL APPLICABILITY

The present invention may be widely applied to a hollow portion formed in a shaft section of a vibrating component, such as a tool holder.

The invention claimed is:

1. A vibration damping mechanism comprising:
a tool holder (1) that has a cylindrical hollow portion (6) that is formed inside and at a center of the tool holder, extending in a direction of an axis of the tool holder,
a plurality of weight members (14) that are divided radially from each other about the axis, the weight members having curved outer peripheries, being assembled into a cylindrical pillar shape so that the outer peripheries of the weight members form a cylindrical outer shape to be accommodated within the cylindrical hollow portion; the outer peripheries of the weight members having a smaller radius by a predetermined amount than an inner periphery of the hollow portion, dividing faces (15) of the weight members adjacent each other being allowed to slide against each other in a radial direction that is perpendicular to the axis, and
an urging member (16) that urges the weight members toward the axis, being arranged between the outer peripheries of the weight members and the inner periphery of the hollow portion such that the dividing faces of adjacent weight members are brought into surface contact with each other.

2. The vibration damping mechanism according to claim 1, wherein
the urging member comprises an annular elastic member.

3. The vibration damping mechanism according to claim 1, further comprising:
a restricting member (17) that is arranged inside the hollow portion in order to restrict the weight members away from the axis.

4. The vibration damping mechanism according to claim 2, further comprising:
a restricting member (17) that is arranged inside the hollow portion in order to restrict the weight members away from the axis.

5. The vibration damping mechanism according to claim 1, further comprising:
another urging member that urges the weight members towards the axis, wherein
one of the urging members is disposed at one end of the hollow portion in the direction of the axis, and the other of the urging members is disposed at the other end thereof.

6. The vibration damping mechanism according to claim 5, wherein
the urging member and the another urging member are identical.

7. The vibration damping mechanism according to claim 5, further comprising:
a restricting member (17) that is arranged inside the hollow portion in order to restrict the weight members away from the axis, being arranged at a middle between the urging members in the direction of axis.

8. The vibration damping mechanism according to claim 1, wherein
the weight members are equidistantly divided from each other forming identical fan shapes in an axis view.

9. The vibration damping mechanism according to claim 1, wherein
the weight members are non-equidistantly divided from each other in an axis view.

10. The vibration damping mechanism according to claim 1, wherein
the weight members are formed of super-hard alloy, and the urging member is formed of an elastic material.

11. The vibration damping mechanism according to claim 1, wherein
an outer gap (12b) is formed between the cylindrical hollow portion of the tool holder and the outer peripheries of the weight members along the axis.

12. The vibration damping mechanism according to claim 1, further comprising:
a coolant pipe (10), through which coolant runs, that is arranged inside the weight members coaxially extending along the axis, wherein
an inner gap (12a) is formed between the coolant pipe and the weight members along the axis.

13. The vibration damping mechanism according to claim 11, further comprising:
a coolant pipe (10), through which coolant runs, that is arranged inside the weight members coaxially extending along the axis, wherein
an inner gap (12a) is formed between the coolant pipe and the weight members along the axis.

* * * * *